United States Patent
Byun et al.

(10) Patent No.: US 12,307,752 B2
(45) Date of Patent: May 20, 2025

(54) ELECTRONIC DEVICE AND CONTROL METHOD THEREOF

(71) Applicant: SAMSUNG ELECTRONICS CO., LTD., Suwon-si (KR)

(72) Inventors: Dongnam Byun, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 17/992,659

(22) Filed: Nov. 22, 2022

(65) Prior Publication Data

US 2023/0085127 A1    Mar. 16, 2023

Related U.S. Application Data

(63) Continuation of application No. PCT/KR2021/004808, filed on Apr. 16, 2021.

(30) Foreign Application Priority Data

Jun. 15, 2020    (KR) .................. 10-2020-0072359

(51) Int. Cl.
*G06V 10/778*    (2022.01)
*G06N 3/045*    (2023.01)
(Continued)

(52) U.S. Cl.
CPC .......... *G06V 10/778* (2022.01); *G06N 3/045* (2023.01); *G06V 10/762* (2022.01);
(Continued)

(58) Field of Classification Search
CPC .. G06V 10/778; G06V 10/762; G06V 10/764; G06V 10/7715; G06V 10/82;
(Continued)

(56) References Cited

U.S. PATENT DOCUMENTS 8,989,442 B2    3/2015    Mei et al.
10,019,654 B1 *    7/2018    Pisoni .................... G06V 10/82
(Continued)

FOREIGN PATENT DOCUMENTS

JP    2019-139716 A    8/2019
KR    10-1180584 B1    9/2012
(Continued)

OTHER PUBLICATIONS

Communication dated Jul. 30, 2021, issued by the International Searching Authority in counterpart International Application No. PCT/KR2021/004808 (PCT/ISA/210).
(Continued)

*Primary Examiner* — Michael S Osinski
(74) *Attorney, Agent, or Firm* — Sughrue Mion, PLLC

(57) ABSTRACT

An electronic device is provide, the electronic device including: a communication interface including at least one circuit; a memory including at least one instruction; and a processor. The processor is configured to: obtain a plurality of images, wherein the plurality of images include an one or more objects; obtain, by inputting the plurality of photographed images into a first neural network model for identifying objects: a feature value for each object of the one or more objects, a predicted class for each object of the one or more objects based on the respective obtained feature values, and a probability value for the predicted class for each of the one or more objects; identify an one or more learning images among the plurality of images based on the obtained probability values; identify one or more clusters of feature values by mapping the feature values of the one or more objects included in the one or more identified learning images to a vector space; obtain a learning data from the one or more identified learning images based on the obtained feature values; transmit the obtained learning data to an external
(Continued)

device through the communication interface; receive an information on a second neural network model from the external device, and update the first neural network model based on the received information on the second neural network model.

15 Claims, 14 Drawing Sheets

(51) Int. Cl.
  *G06V 10/762* (2022.01)
  *G06V 10/764* (2022.01)
  *G06V 10/77* (2022.01)
  *G06V 10/82* (2022.01)

(52) U.S. Cl.
  CPC ........ *G06V 10/764* (2022.01); *G06V 10/7715* (2022.01); *G06V 10/82* (2022.01)

(58) Field of Classification Search
  CPC .... G06V 10/774; G06V 20/70; G06V 10/454; G06V 40/172; G06V 10/255; G06V 10/776; G06V 40/103; G06V 10/25; G06V 10/462; G06V 10/26; G06N 3/045; G06N 3/044; G06N 3/0464; G06N 3/0475; G06N 3/0495; G06N 3/088; G06N 3/09; G06N 3/047; G06N 3/08; G06N 3/084; G06N 20/00; G06N 3/04; G06F 18/214; G06F 18/217; G06F 16/5854; G06F 18/2413; G06F 16/583; G06F 18/21347; G06F 18/23; G06F 18/2431; G06T 2207/20081; G06T 2207/20084; G06T 7/11
  See application file for complete search history.

(56) References Cited

U.S. PATENT DOCUMENTS

| | | | |
|---|---|---|---|
| 10,229,347 B2 | 3/2019 | Harary et al. | |
| 10,325,181 B2 | 6/2019 | Xu et al. | |
| 10,452,954 B2 | 10/2019 | Schroff et al. | |
| 10,504,027 B1* | 12/2019 | Kim | G06V 10/82 |
| 10,713,794 B1* | 7/2020 | He | G06N 3/084 |
| 11,194,338 B2 | 12/2021 | Chae et al. | |
| 11,373,095 B2* | 6/2022 | Barkan | G06V 10/764 |
| 11,645,869 B2* | 5/2023 | El-Khamy | G06V 10/82 382/118 |
| 11,995,417 B2* | 5/2024 | Hwang | G06F 17/15 |
| 2011/0268323 A1 | 11/2011 | Gallagher | |
| 2017/0046613 A1* | 2/2017 | Paluri | G06N 3/045 |
| 2017/0154425 A1 | 6/2017 | Pierce et al. | |
| 2018/0349744 A1 | 12/2018 | Schulz et al. | |
| 2018/0373953 A1* | 12/2018 | Tomotaki | G06V 20/42 |
| 2019/0014121 A1 | 1/2019 | Nakamura | |
| 2019/0043185 A1* | 2/2019 | Hwang | G06F 18/24133 |
| 2019/0080204 A1* | 3/2019 | Schroff | G06V 10/761 |
| 2019/0095764 A1 | 3/2019 | Li | |
| 2019/0122406 A1* | 4/2019 | Wang | G16H 50/70 |
| 2019/0164290 A1* | 5/2019 | Wang | G06N 3/08 |
| 2019/0228268 A1* | 7/2019 | Zhang | G06V 10/82 |
| 2019/0303759 A1 | 10/2019 | Farabet et al. | |
| 2019/0385024 A1* | 12/2019 | Croxford | G06N 3/08 |
| 2019/0392254 A1 | 12/2019 | Oh et al. | |
| 2020/0019842 A1 | 1/2020 | Kim | |
| 2020/0026956 A1* | 1/2020 | Kumar | G06F 18/2431 |
| 2020/0134380 A1* | 4/2020 | Xu | G06V 10/454 |
| 2020/0218938 A1* | 7/2020 | Stolikj | G06V 40/172 |
| 2020/0244476 A1 | 7/2020 | Kim et al. | |
| 2020/0285737 A1* | 9/2020 | Kraus | G06F 21/552 |
| 2020/0336802 A1* | 10/2020 | Russell | H04N 21/26603 |
| 2020/0380168 A1* | 12/2020 | Klinkigt | G06N 20/00 |
| 2020/0402221 A1* | 12/2020 | Ijiri | G06N 3/084 |
| 2021/0089807 A1* | 3/2021 | Liu | G06N 3/045 |
| 2021/0295423 A1* | 9/2021 | Gupta | G06V 10/764 |
| 2021/0334587 A1* | 10/2021 | Wang | G06T 7/001 |
| 2022/0083868 A1* | 3/2022 | Zhou | G06N 3/084 |
| 2022/0171760 A1* | 6/2022 | Qiu | H04N 21/84 |
| 2023/0093630 A1* | 3/2023 | Schnitzler | G06N 3/045 |
| 2023/0196726 A1* | 6/2023 | Deng | G06V 10/762 382/128 |

FOREIGN PATENT DOCUMENTS

| | | |
|---|---|---|
| KR | 10-1879735 B1 | 7/2018 |
| KR | 10-2019-0043258 A | 4/2019 |
| KR | 10-2019-0071640 A | 6/2019 |
| KR | 10-2019-0126857 A | 11/2019 |
| KR | 10-2049331 B1 | 11/2019 |

OTHER PUBLICATIONS

Communication dated Jul. 30, 2021, issued by the International Searching Authority in counterpart International Application No. PCT/KR2021/004808 (PCT/ISA/237).
Y. Roh, G. Heo and S. E. Whang, "A Survey on Data Collection for Machine Learning: A Big Data—AI Integration Perspective," in IEEE Transactions on Knowledge and Data Engineering, vol. 33, No. 4, pp. 1328-1347, Apr. 1, 2021, doi: 10.1109/TKDE.2019.2946162.
V. Kaushal, R. Iyer, S. Kothawade, R. Mahadev, K. Doctor and G. Ramakrishnan, "Learning From Less Data: A Unified Data Subset Selection and Active Learning Framework for Computer Vision," 2019 IEEE Winter Conference on Applications of Computer Vision (WACV), Waikoloa, HI, USA, 2019, pp. 1289-1299, doi: 10.1109/WACV.2019.00142.
D. K. Shin, M. U. Ahmed and P. K. Rhee, "Incremental Deep Learning for Robust Object Detection in Unknown Cluttered Environments," in IEEE Access, vol. 6, pp. 61748-61760, 2018, doi: 10.1109/ACCESS.2018.2875720.
European Extended Search Report issued Nov. 2, 2023 issued by the European Patent Office for EP Patent Application No. 21826915.7.
Extended European Search Report dated Jul. 12, 2024, issued by the European Patent Office in European Application No. 21826915.7.

* cited by examiner

ELECTRONIC DEVICE AND CONTROL METHOD THEREOF

CROSS-REFERENCE TO RELATED APPLICATION

This application is a by-pass continuation application of International Application No. PCT/KR2021/004808, filed on Apr. 16, 2021, which is based on and claims priority to Korean Patent Application No. 10-2020-0072359, filed on Jun. 15, 2020 in the Korean Intellectual Property Office, the disclosures of which are incorporated by reference herein in their entireties.

TECHNICAL FIELD

The disclosure relates to an electronic device and a control method thereof, and more particularly, to an electronic device that updates a neural network model, and a control method thereof.

DESCRIPTION OF THE RELATED ART

Recently, artificial intelligence systems are being used in various fields. An artificial intelligence system is a system wherein a machine learns, determines, and becomes smarter by itself, unlike conventional rule-based smart systems. An artificial intelligence system shows an improved recognition rate as it is used more, and becomes capable of understanding user preference with greater accuracy. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself, and an element technology refers to a technology of performing functions of a human brain such as cognition and determination by using a machine learning algorithm such as deep learning, and consists of fields of technology such as linguistic understanding, visual understanding, inference/prediction, knowledge representation, and operation control. In particular, linguistic understanding refers to a technology of recognizing languages/characters of humans and applying/processing them, and includes natural speech processing, machine translation, communication systems, queries and answers, voice recognition/synthesis, and the like.

Recently, various electronic devices (for example, a robot cleaner, etc.) are being released while including a neural network model for object identification. Meanwhile, a neural network model stored in an electronic device cannot classify all objects due to limits in terms of performance such as the CPU or the memory capacity of the electronic device, etc., and in general, a neural network model is trained to be able to classify only objects designated by the manufacturer in advance. Accordingly, users' needs for updating a neural network model to be more appropriate for a use environment of an electronic device are increasing.

Accordingly, there is a rising need for a technology of updating a neural network model.

SUMMARY

A technical task that the disclosure aims to resolve is providing an electronic device that obtains learning data for updating a neural network model.

Meanwhile, technical tasks of the disclosure are not limited to the technical tasks mentioned above, and other technical tasks that were not mentioned would be clearly understood by a person having ordinary knowledge in the technical field to which the disclosure pertains from the descriptions below.

According to an aspect of the disclosure, there is provided a method of controlling an electronic device, the method including: obtaining a plurality of images, wherein the plurality of images include an one or more objects; inputting the plurality of images into a first neural network model for identifying objects, and based on the inputting of the plurality of images into the first neural network model for identifying objects, obtaining a feature value for each object of the one or more objects, a predicted class for each object of the one or more objects based on the respective obtained feature value, and a probability value for the predicted class for each of the one or more objects; identifying an one or more learning images among the plurality of images based on the obtained probability values; identifying a one or more clusters of feature values by mapping the feature values of the one or more objects included in the one or more identified learning images to a vector space; obtaining a learning data from the one or more identified learning images based on the obtained feature values; transmitting the obtained learning data to an external device; receiving an information on a second neural network model from the external device; and updating the first neural network model based on the received information on the second neural network model.

The step of identifying the one or more learning images may further include identifying the one or more learning images based on the inclusion of objects from among the one or more objects for which the probability value is less than a predetermined value.

The step of obtaining the learning data may further include identifying at least one cluster having greater cohesion than a predetermined value among the one or more clusters of feature values including the feature values of the one or more objects included in the one or more identified learning images; and obtaining an one or more images corresponding to the feature values included in the identified at least one cluster of feature values as the learning data.

The step of obtaining the one or more images corresponding to the feature values included in the identified at least one cluster of feature values as the learning data may further include identifying and obtaining as the learning data an image corresponding to a feature value that is the most approximate to the average of the feature values included in the identified at least one cluster of feature values.

The method of controlling an electronic device may further include: storing the obtained learning data, wherein storing the obtained learning data may include: identifying a cluster of feature values including feature values greater than or equal to a predetermined number among the identified at least one cluster of feature values, and storing images corresponding to the feature values included in the identified cluster.

The learning data may be at least one image among the one or more learning images, and the learning data includes location information of pixels corresponding to the objects included in the at least one image.

The second neural network model may be a model obtained from a third neural network model having a greater accuracy than the first neural network model, and the third neural network was trained based on the obtained learning data.

According to an aspect of the disclosure, there is provided an electronic device including: a communication interface including at least one circuit; a memory including at least one instruction; and a processor. The processor is configured to: obtain a plurality of images, wherein the plurality of images include an one or more objects; obtain, by inputting the plurality of photographed images into a first neural network model for identifying objects: a feature value for each object of the one or more objects, a predicted class for each object of the one or more objects based on the respective obtained feature values, and a probability value for the predicted class for each of the one or more objects; identify an one or more learning images among the plurality of images based on the obtained probability values; identify one or more clusters of feature values by mapping the feature values of the one or more objects included in the one or more identified learning images to a vector space; obtain a learning data from the one or more identified learning images based on the obtained feature values; transmit the obtained learning data to an external device through the communication interface; receive an information on a second neural network model from the external device, and update the first neural network model based on the received information on the second neural network model.

The processor may be further configured to: identify the one or more leaning images based on the inclusion of objects from among the one or more objects for which the probability values are less than a predetermined value.

The processor may be further configured to: identify at least one cluster having greater cohesion than a predetermined value among the one or more clusters of feature values including the feature values of the one or more objects included in the identified learning images, and obtain an one or more images corresponding to the feature values included in the identified at least one cluster of feature values as the learning data.

The processor may be further configured to: identify and obtain as the learning data an image corresponding to a feature value that is the most approximate to the average of the feature values included in the identified at least one cluster of feature values.

The processor may be further configured to: identify a cluster of feature values including feature values greater than or equal to a predetermined number among the identified at least one cluster, and store images corresponding to the feature values included in the identified cluster of feature values.

The learning data may be at least one image among the one or more learning images, and the learning data may include location information of pixels corresponding to the objects included in the at least one image.

The second neural network model may be a model obtained from a third neural network model having a greater accuracy than the first neural network model, and the third neural network may be trained based on the obtained learning data.

According to an aspect of the disclosure, there is provided a neural network model update system that may include an electronic device and an external device. The electronic device may be configured to: obtain a plurality of images, obtain a learning data from the plurality of photographed images by using a first neural network model, transmit the obtained learning data to the external device, receive from the external device an information on a second neural network model, and update the first neural network model based on the information on the second neural network model obtained from the external device. The external device may be configured to: input the learning data into a fourth neural network model and obtain a labelled data, train a third neural network model based on the labelled data, obtain the information on the second neural network model by compressing the third neural network model, and transmit the information on the second neural network model to the electronic device.

Meanwhile, the means for resolving the tasks of the disclosure are not limited to the aforementioned, and other devices, systems and methods that were not mentioned would be clearly understood by a person having ordinary knowledge in the technical field to which the disclosure pertains from this specification and the accompanying drawings.

According to the various embodiments of the disclosure set forth above, an electronic device can update a neural network model stored in the electronic device. Accordingly, the object recognition rate of the neural network model can be improved.

Other than the above, regarding effects that can be obtained or predicted from the embodiments of the disclosure, direct or implicit descriptions will be made in the detailed description for the embodiments of the disclosure. For example, regarding various effects that are predicted according to the embodiments of the disclosure, descriptions will be made in the detailed description that will be described below.

DETAILED DESCRIPTION

Figure 1:
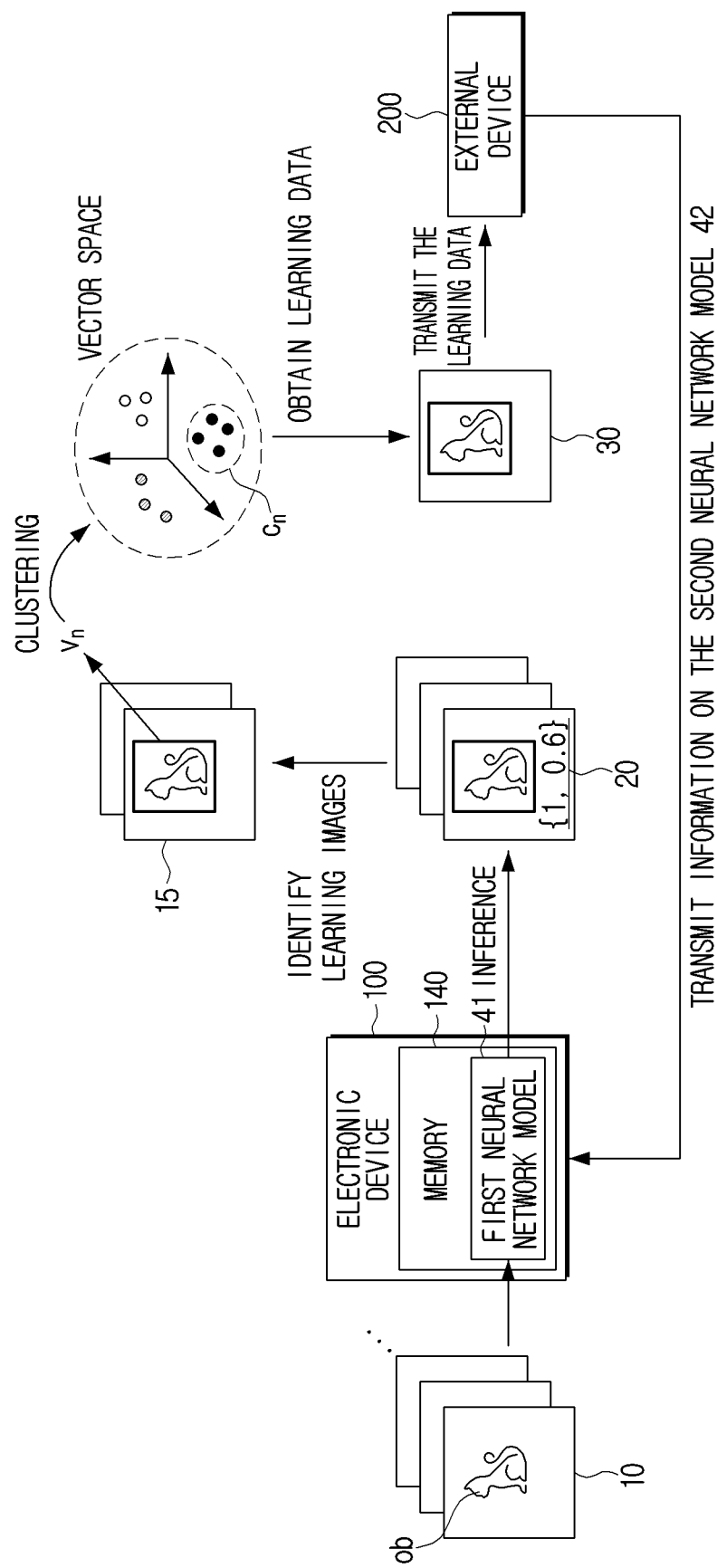
FIG. 1 is a diagram for illustrating a neural network model update system according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not intended to limit the scope of the disclosure to a specific embodiment, but they should be interpreted to include all modifications, equivalents, or alternatives of the embodiments included in the idea and the technical scope disclosed herein.

In addition, terms such as 'the first,' 'the second,' and the like may be used to describe various components, but the components should not be limited by the terms. The terms are used only for the purpose of distinguishing one component from another component.

Further, singular expressions include plural expressions, as long as they do not obviously mean differently in context. In addition, in the disclosure, terms such as "include" and "comprise" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that a person having ordinary knowledge in the technical field to which the disclosure pertains can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a neural network model update system according to an embodiment of the disclosure. The neural network model update system may include an electronic device 100 and an external device 200. The electronic device 100 is a device storing a neural network model, and it may be, for example, a robot cleaner, a smart robot, or a smart cam. The external device 200 is a device having a higher performance compared to the electronic device 100, and it may be a device that has a faster operation processing speed, and a bigger memory capacity compared to the electronic device 100. For example, the external device 200 may be a personal computer (PC) or a mobile terminal device. The neural network model update system may update the neural network model stored in the electronic device 100 by using the external device 200 having a relatively higher performance compared to the electronic device 100. Hereinafter, a method of updating a neural network model will be described in more detail.

The electronic device 100 may obtain a plurality of photographed images 10. Here, the electronic device 100 may obtain the plurality of photographed images 10 by photographing the surroundings of the electronic device 100 using a camera 110 installed on the electronic device 100.

The electronic device 100 may obtain an output value 20 as a result of inference for an object ob by inputting the plurality of photographed images 10 into a first neural network model 41 stored in a memory 140. Here, the first neural network model 41 is a neural network model trained to identify or recognize an object included in an image. Also, the output value 20 is a value for the inference result of the first neural network model 41 for the object ob, and it may include a classification value for the object ob and a probability value for the classification value. The classification value may mean a predicted class for the object ob. The probability value is a value indicating a probability that the object ob is an object corresponding to the classification value, i.e., a value indicating a probability that the predicted class for the object ob is the actual class of the object ob, and it may also be referred to as a score. For example, the output value 20 of the first neural network model 41 for the object ob may be "{1 (a value corresponding to a cat), 0.6 (a probability that an object is a cat)}." Also, the output value 20 may include information on an area wherein the object ob is located within the photographed images 10. For example, the information on the area wherein the object ob is located may be coordinate information of a bounding box for the object.

Meanwhile, the first neural network model 41 cannot classify all objects due to limits in terms of performance such as the CPU or the memory capacity of the electronic device 100, and in general, a neural network model is trained to be able to classify only objects designated by the manufacturer in advance. Accordingly, the first neural network model 41 needs to be updated to be more appropriate for the environment wherein the electronic device 100 is located. For this, the electronic device 100 may obtain learning data 30 for update of the first neural network model 41.

Specifically, the electronic device 100 may identify an image including an object having a smaller probability value than a predetermined value (e.g., 0.7) among the plurality of photographed images 10 as an image to be learned 15 (hereinafter, "learning image"). For example, if the probability value for the object ob obtained through the first neural network model 41 is smaller than the predetermined value, the electronic device 100 may identify the image including the object ob as the learning image 15.

Then, the electronic device 100 may obtain a feature value $V_n$ for the object included in the learning image 15. Here, the feature value $V_n$ is a value indicating a feature for the object, and it may also be referred to as a feature vector or feature information. The electronic device 100 may obtain the feature value $V_n$ for an object included in the plurality of photographed images 10 as an intermediate output value which is a result of inputting the plurality of photographed images 10 into the first neural network model 41. The feature value $V_n$ is a value indicating a feature for the object ob, and it may also be referred to as a feature vector or feature information. Also, the feature value $V_n$ may correspond to the output value 20. Specifically, the output value 20 may be obtained based on the feature value $V_n$.

The electronic device 100 may perform clustering by mapping the obtained feature value $V_n$ to a random vector space. Clustering means grouping feature values having similar features by mapping feature values to a random vector space. The electronic device 100 may identify the clustered feature value $V_n$ in the vector space. The electronic device 100 may obtain the learning data 30 from the plurality of learning images 15 based on the identified feature value $V_n$. Specifically, the electronic device 100 may identify a cluster $C_n$ having bigger cohesion than a predetermined value among the plurality of clusters existing in the vector space. Here, the cohesion means an index indicating how coherent the feature information having relevance to one another is in the vector space. The electronic device 100 may identify a feature value that is the most approximate to the average of the plurality of feature values among the plurality of feature values included in the identified cluster $C_n$. The electronic device 100 may identify the learning image 15 corresponding to the feature value included in the identified cluster as the learning data 30.

Then, the electronic device 100 may transmit the obtained learning data 30 to the external device 200. The external device 200 may obtain a second neural network model 42 based on the learning data 30. Specifically, the external device 200 may train a third neural network model 43 having a higher performance than the first neural network model 41 based on the learning data 30. For example, the third neural network model 43 may identify a greater variety of objects than the first neural network model 41. Then, the external device 200 may lighten the weight of the third neural network model 43, and obtain the second neural network model 42. Meanwhile, the process by which the external device 200 obtains the second neural network model 42 will be described in more detail in FIG. 3.

The external device 200 may transmit information on the obtained second neural network model 42 to the electronic device 100. Here, the information on the second neural network model 42 may be information regarding the second neural network model 42 itself, or a parameter included in the second neural network model 42. The parameter may be a weighted value. The weighted value may be a vector value including several elements.

The electronic device 100 may update the first neural network model 41 based on the information on the second neural network model 42. For example, the electronic device 100 may store the second neural network model 42 in the memory 140, and delete the first neural network model 41. Alternatively, the electronic device 100 may change the parameter of the first neural network model 41 to the parameter of the second neural network model 42.

In the above, the operation of the neural network model update system was described. Hereinafter, the configurations of the electronic device and the external device constituting the neural network model update system will be described.

Figure 2:
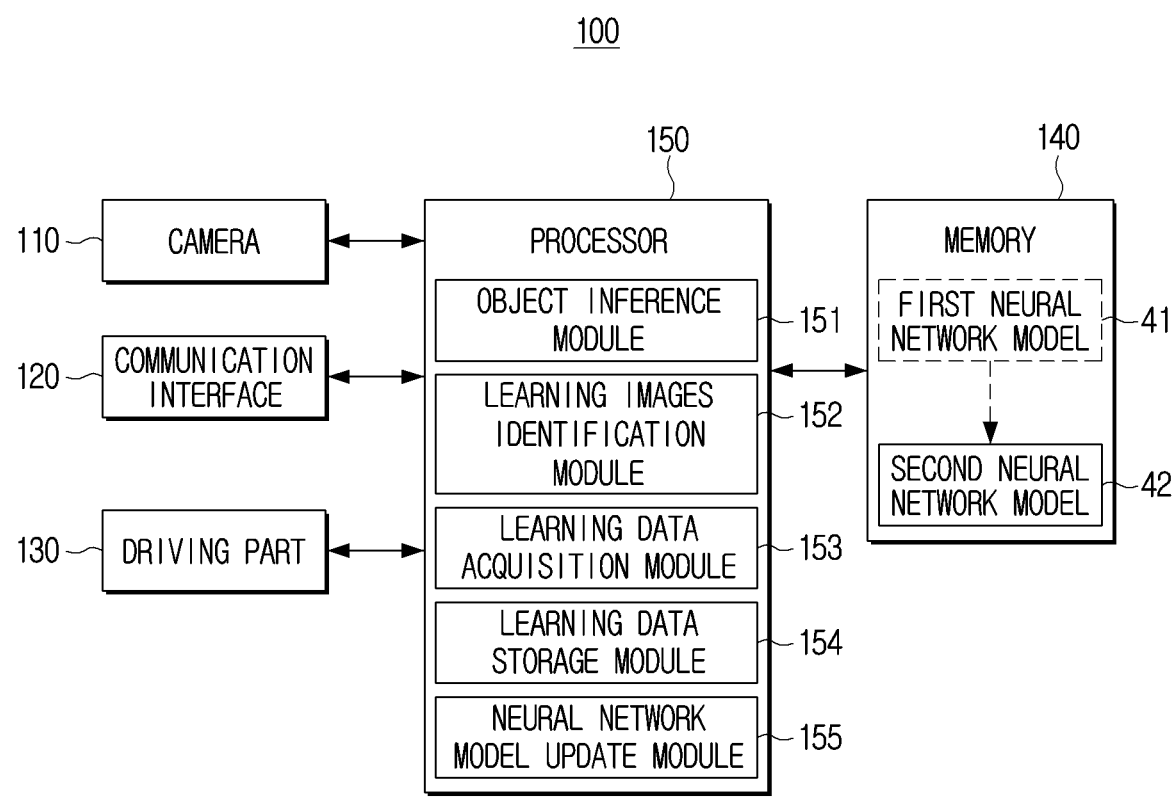
FIG. 2 is a block diagram illustrating a configuration of an electronic device according to an embodiment of the disclosure.

FIG. 2 is a block diagram illustrating a configuration of an electronic device according to an embodiment of the disclosure. Referring to FIG. 2, the electronic device 100 may include a camera 110, a communication interface 120, a driving part 130, a memory 140, and a processor 150.

The camera 110 may obtain a plurality of photographed images. For example, the camera 110 may be installed on the electronic device 100 and photograph the surroundings of the electronic device 100, and obtain a photographed image.

Meanwhile, the camera 110 may be implemented as cameras in various types. For example, the camera 110 may be implemented as an RGB camera or an IR camera based on 2D, or implemented as a Time of Flight (ToF) camera or a stereo camera based on 3D. Also, the camera 110 may be implemented in a form wherein two or more cameras among the aforementioned cameras are combined.

The communication interface 120 includes at least one circuit, and it may perform communication with external devices in various types according to communication methods in various types. The communication interface 120 may include a Wi-Fi chip and a Bluetooth chip. The electronic device 100 may communicate with an external server or the external device 200 through the communication interface 120.

The driving part 130 may be a component for moving the electronic device 100. In particular, the driving part 130 may include an actuator for driving of the electronic device 100. Also, other than the driving part 130, an actuator for driving motions of other physical components (e.g., an arm, etc.) of the electronic device 100 may be included.

The memory 140 may store an operating system (OS) for controlling the overall operations of the components of the electronic device 100, and instructions or data related to the components of the electronic device 100. For this, the memory 140 may be implemented as a non-volatile memory (ex: a hard disc, a solid state drive (SSD), a flash memory), a volatile memory, etc. The memory 140 may store a neural network model for recognizing or identifying an object. In particular, the neural network model may be executed by a conventional generic-purpose processor (e.g., a CPU) or a separate AI-dedicated processor (e.g., a GPU, an NPU, etc.). For example, the memory 140 may include the first neural network model 41 for identifying an object. Also, the first neural network model 41 may be updated to the second neural network model 42 as described above in FIG. 1.

The processor 150 may control the overall operations of the electronic device 100. The processor 150 may include an object inference module 151, a learning images identification module 152, a learning data acquisition module 153, a learning data storage module 154, and a neural network model update module 155. Hereinafter, operations of each module will be described in detail.

The object inference module 151 may obtain feature values $V_n$ for objects included in the plurality of photographed images 10 obtained through the camera 110. Also, the object inference module 151 may obtain classification values (i.e., predicted classes) and probability values respectively corresponding to the feature values.

The learning images identification module 152 may identify learning images 15 among the plurality of photographed images 10 based on probability values for objects ob obtained through the object inference module 151. Specifically, the learning images identification module 152 may identify the photographed images 10 including objects ob having probability values smaller than a predetermined value as the learning images 15.

The learning data acquisition module 153 may obtain the learning data 30 based on the learning images 15. Specifically, the learning data acquisition module 153 may cluster the feature values by mapping the feature values $V_n$ for the objects ob included in the learning images 15 to a random vector space. Then, the learning data acquisition module 153 may identify at least one cluster $C_n$ having greater cohesion than a predetermined value among the plurality of clusters existing in the vector space. Also, the learning data acquisition module 153 may identify at least one cluster including feature values $V_n$ greater than or equal to a predetermined number among the clusters having bigger cohesion than the predetermined value.

The learning data acquisition module 153 may identify the learning images 15 corresponding to the feature values included in the identified clusters $C_n$ as the learning data 30. Here, the learning data acquisition module 153 may identify a feature value $V_n$ that is the most approximate to the average of the plurality of feature values among the plurality of feature values included in the identified clusters. Alternatively, the learning data acquisition module 153 may identify a feature value $V_n$ that is the most approximate to the center of the identified clusters $C_n$. Meanwhile, the learning data acquisition module 153 may identify a plurality of feature values within one cluster. Here, the learning data acquisition module 153 may identify a plurality of feature values $V_n$ within a threshold range from the average of the feature values $V_n$. Alternatively, the learning data acquisition module 153 may identify a plurality of feature values $V_n$ within a threshold range from the center of the clusters.

Then, the learning data acquisition module 153 may identify the learning images 15 including the objects ob corresponding to the identified feature values $V_n$ as the learning data 30. Here, the learning data 30 may include raw data regarding the learning images 15, and location information of the objects ob corresponding to the identified feature information among the objects ob included in the learning images 15. Here, the location information of the objects ob may be the coordinate information of the bounding boxes for the objects ob.

The learning data storage module 154 may store the obtained learning data 30 in the memory 140. Here, the learning data storage module 154 may select only some of the learning data 30 and store it in the memory 140, in consideration of the capacity of the memory 140. Specifically, the learning data storage module 154 may identify the learning data 30 to be stored based on the priorities of the clusters corresponding to the obtained learning data 30. Here, the priorities of the clusters $C_n$ may be set based on the number of the feature values $V_n$ included in the clusters $C_n$. Also, in case a plurality of learning data 30 corresponding to the same cluster $C_n$ was obtained, the learning data storage module 154 may select some of the learning data 30 based on the feature values $V_n$ corresponding to the plurality of respective learning data 30. For example, as a feature value $V_n$ is more approximate to the average value of the plurality of feature values included in the same cluster $C_n$, the learning data storage module 154 may identify the priority of the feature value $V_n$ as a higher priority, and store the learning data 30 corresponding to the feature value $V_n$ based on the identified priority in the memory 140. Alternatively, as a feature value $V_n$ is more approximate to the center of the same cluster $C_n$, the learning data storage module 154 may identify the priority of the feature value $V_n$ as a higher priority, and store the learning data 30 corresponding to the feature value $V_n$ based on the identified priority in the memory 140.

The neural network model update module 155 may update the first neural network model 41 based on the information on the second neural network model 42 received from the external device 200. For example, the neural network model update module 155 may store the second neural network model 42 in the memory 140, and delete the first neural network model 41. Alternatively, the neural network model update module 155 may change the parameter (or the weighted value) of the first neural network model 41 to the parameter of the second neural network model 42.

In particular, functions related to artificial intelligence according to the disclosure are operated through the processor 150 and the memory 140. The processor 150 may consist of one or a plurality of processors. Here, the one or plurality of processors 150 may be generic-purpose processors such as a CPU, an AP, a digital signal processor (DSP), etc., graphics-dedicated processors such as a GPU and a vision processing unit (VPU), or artificial intelligence-dedicated processors such as a NPU. The one or plurality of processors 150 may perform control such that input data is processed according to pre-defined operation rules or an artificial intelligence model stored in the memory 140. Alternatively, in case the one or plurality of processors 150 are artificial intelligence-dedicated processors, the artificial intelligence-dedicated processors may be designed as a hardware structure specified for processing of a specific artificial intelligence model.

The predefined operation rules or the artificial intelligence model are characterized in that they are made through learning. Here, being made through learning means that a basic artificial intelligence model is trained by using a plurality of learning data by a learning algorithm, and predefined operations rules or an artificial intelligence model set to perform desired characteristics (or, purposes) are thereby made. Such learning may be performed in a device itself wherein artificial intelligence is performed according to the disclosure, or through a separate server and/or system. As examples of learning algorithms, there are supervised learning, unsupervised learning, semi-supervised learning, or reinforcement learning, but learning algorithms in the disclosure are not limited to the aforementioned examples.

An artificial intelligence model may be made through learning. Here, being made through learning means that a basic artificial intelligence model is trained by using a plurality of learning data by a learning algorithm, and predefined operations rules or an artificial intelligence model set to perform desired characteristics (or, purposes) are thereby made. An artificial intelligence model may consist of a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value or a cost value obtained at the artificial intelligence model during a learning process is reduced or minimized.

Visual understanding is a technology of recognizing an object in a similar manner to human vision, and processing the object, and includes object recognition, object tracking, image retrieval, human recognition, scene recognition, space recognition (3D reconstruction/localization), image enhancement, etc.

An artificial neural network may include a deep neural network (DNN), and there are, for example, a convolutional neural network (CNN), a deep neural network (DNN), a recurrent neural network (RNN), a generative adversarial network (GAN), a restricted Boltzmann Machine (RBM), a deep belief network (DBN), a bidirectional recurrent deep neural network (BRDNN), or deep Q-networks, etc., but the disclosure is not limited to the aforementioned examples.

Figure 3:
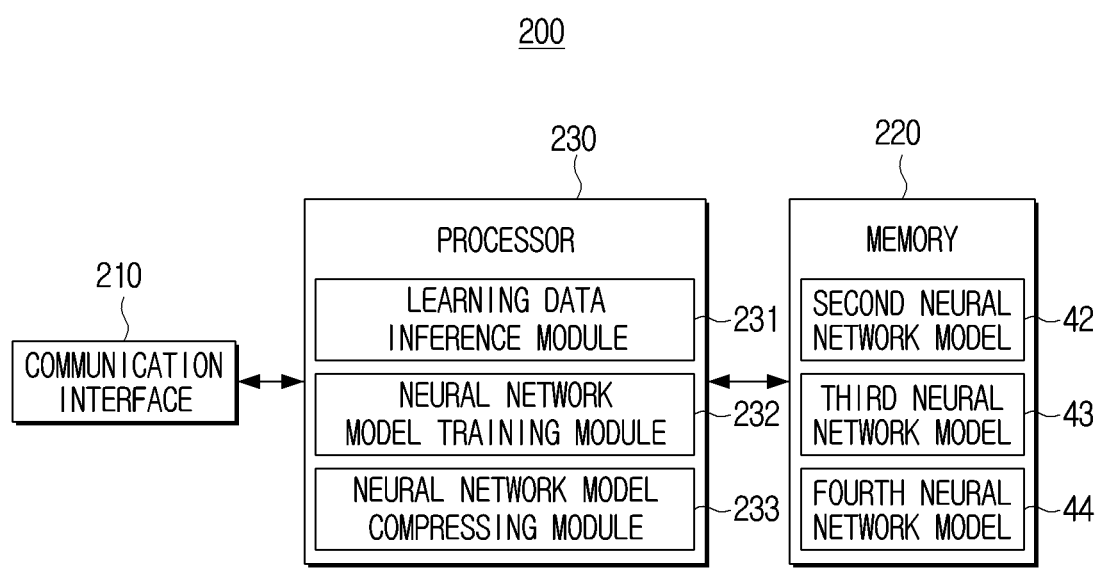
FIG. 3 is a diagram illustrating a configuration of an external device according to an embodiment of the disclosure.

FIG. 3 is a diagram illustrating a configuration of an external device 200 according to an embodiment of the disclosure. Referring to FIG. 3, the external device 200 may include a communication interface 210, a memory 220, and a processor 230. Meanwhile, the communication interface 210 may correspond to the communication interface 120 in FIG. 2, and thus detailed explanation in that regard will be omitted.

The memory 220 may store the third neural network model 43 and the fourth neural network model 44. Here, the third neural network model 43 may be the original model of the first neural network model 41 in FIG. 2. That is, the first neural network model 41 may be a model which is a weight-compressed form of the third neural network model 43. Also, the fourth neural network model 44 may be a model having a higher performance than the third neural network model 43, and it may be a model trained to be able to identify a larger number of objects than the third neural network model 43. Also, the memory 220 may store an operating system (OS) for controlling the overall operations of the components of the external device 200, and instructions or data related to the components of the external device 200. For this, the memory 220 may be implemented as a non-volatile memory (ex: a hard disc, a solid state drive (SSD), a flash memory), a volatile memory, etc.

The processor 230 may control the overall operations of the external device 200. The processor 230 may include a learning data inference module 231, a neural network model training module 232, and a neural network model compressing module 233. Hereinafter, the operations of each module will be described in detail.

The learning data inference module 231 may obtain classification values and probability values for objects included in the learning data 30 by inputting the learning data 30 obtained from the electronic device 100 into the fourth neural network model 44. As the fourth neural network model 44 has a higher performance than the first neural network model 41, the learning data inference module 231 may obtain classification values and probability values for objects ob that cannot be identified by the first neural network model 41 by using the fourth neural network model 44. Then, the learning data inference module 231 may identify an object ob having a greater probability value than a predetermined probability value (e.g., 0.7), and perform a labeling operation for the learning data 30 including the identified object ob. That is, the learning data inference module 231 may match the learning data 30 and classification values for objects ob included in the learning data 30, and store them in the memory 220. Hereinafter, the learning data 30 labeled by the learning data inference module 231 will be referred to as the labelled data 31.

The neural network model training module 232 may train the third neural network model 43 based on the labelled data 31. Here, the neural network model training module 232 may train the third neural network model 43 based on the labelled data 31 and the learning data 30 for the first neural network model 41. Accordingly, a situation where the third neural network model 43 is biased or overfitted can be prevented. Meanwhile, the neural network model training module 232 trains the third neural network model 43 which is the original model (i.e., the model before compression) of the first neural network model 41, but not the first neural network model 41, and accordingly, the learning time can be shortened.

The neural network model compression module 233 may obtain the second neural network model 42 by compressing the weight of the trained third neural network model 43. Specifically, the neural network model compression module 233 may obtain the second neural network model 42 by converting the data type of the weighted value of the third neural network model 43. For example, in case the weighted value of the third neural network model 43 is a value of a 32-bit float type, the neural network model compression module 233 may convert the weighted value of the third neural network model 43 to a value of an 8-bit integer type. That is, the neural network model compression module 233 may obtain the second neural network model 42 by compressing the size of the weighted value of the third neural network model 43. In this manner, the neural network model compression module 233 may obtain the second neural network model 42 which is a compressed form of the third neural network model 43. Then, the processor 230 may transmit the second neural network model 42 to the electronic device 100 through the communication interface 210. Accordingly, even in case the capacity of the memory 140 of the electronic device 100 is restrictive, the electronic device 100 may update the first neural network model 41 to the second neural network model 42.

Figure 4A:
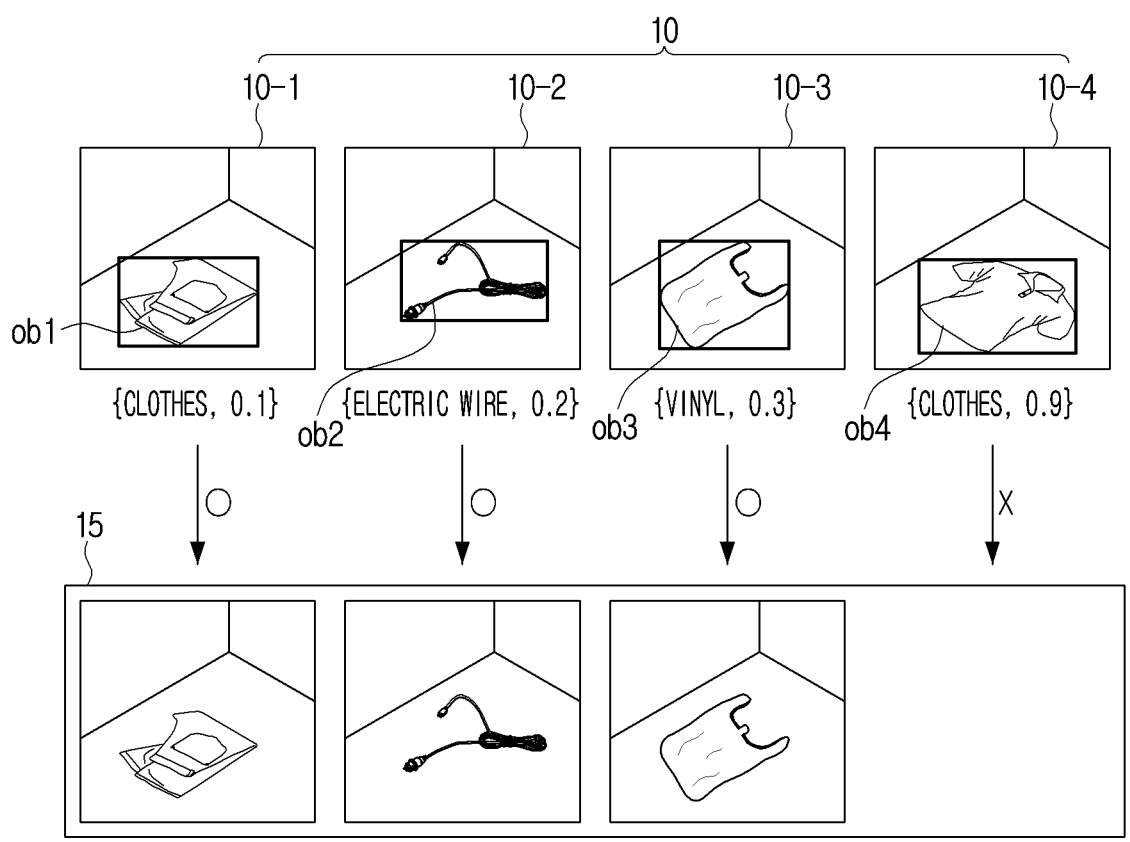
FIG. 4A is a diagram for illustrating a method of identifying learning images according to an embodiment of the disclosure.

FIG. 4A is a diagram for illustrating a method of identifying learning images 15 according to an embodiment of the disclosure. The electronic device 100 may obtain classification values and probability values for objects included in the plurality of respective photographed images 10 by respectively inputting the plurality of photographed images 10 into the first neural network model 41. For example, the electronic device 100 may obtain a classification value ('clothes') and a probability value ('0.1') for a first object ob1 by inputting a first photographed image 10-1 into the first neural network model 41. The electronic device 100 may obtain a classification value ('an electric wire') and a probability value ('0.2') for a second object ob2 by inputting a second photographed image 10-2 into the first neural network model 41. The electronic device 100 may obtain a classification value ('vinyl') and a probability value ('0.3') for a third object ob3 by inputting a third photographed image 10-3 into the first neural network model 41. The electronic device 100 may obtain a classification value ('clothes') and a probability value ('0.9') for a fourth object ob4 by inputting a fourth photographed image 10-4 into the first neural network model 41. Meanwhile, in FIG. 4A, a classification value for each object was expressed in a word indicating the object, for the convenience of explanation, but as described above, a classification value may be a numerical value corresponding to each object.

Then, the electronic device 100 may identify the learning images 15 based on the probability values for the objects included in the plurality of respective photographed images 10. Specifically, the electronic device 100 may identify images including objects for which the probability values are smaller than a predetermined value among the plurality of photographed images 10 as the learning images 15. Here, the predetermined value may mean a value for evaluating the recognition rate or the learning degree of the electronic device 100 for objects. The electronic device 100 needs to be additionally trained for objects having smaller probability values than the predetermined value. For example, in case the predetermined value is 0.6, the electronic device 100 may identify the first photographed image 10-1, the second photographed image 10-2, and the third photographed image 10-3 respectively including the first object ob1, the second object ob2, and the third object ob3 for which the probability values are smaller than 0.6, as the learning images 15. By contrast, the electronic device 100 may not identify the fourth photographed image 10-4 including the fourth object ob4, for which the probability value is bigger than 0.6, as an learning image 15.

Figure 4B:
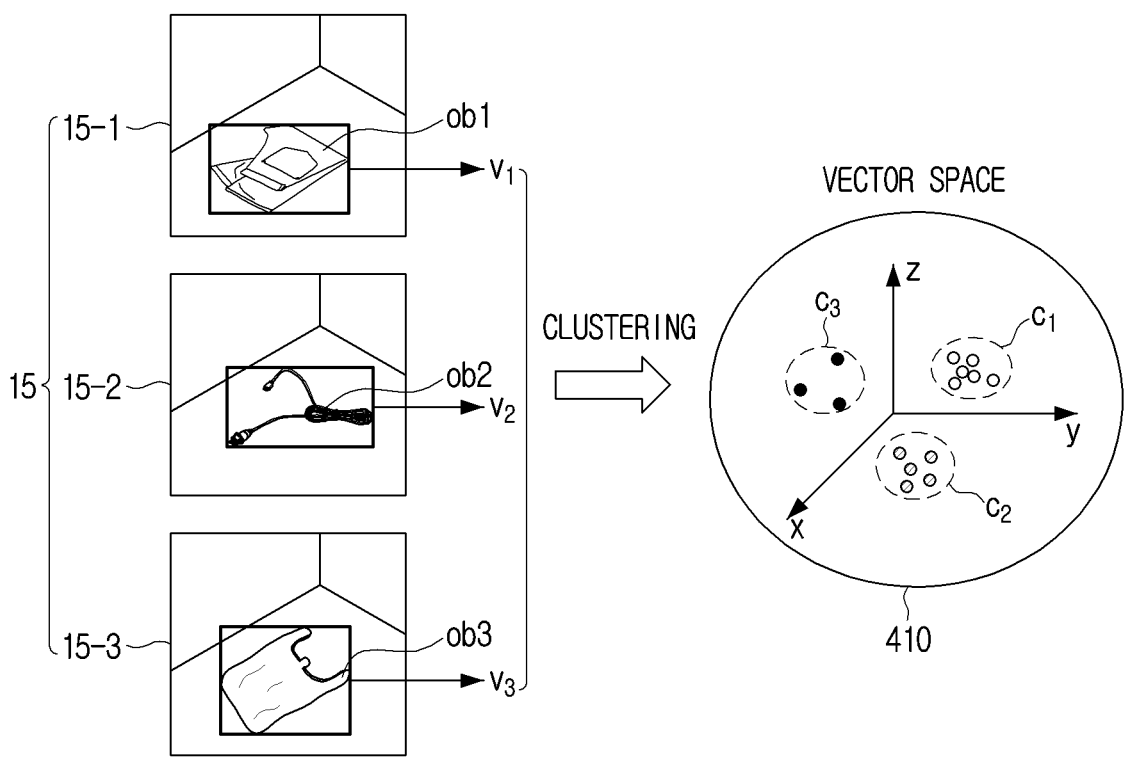
FIG. 4B is a diagram for illustrating a method of clustering according to an embodiment of the disclosure.
Figure 4C:
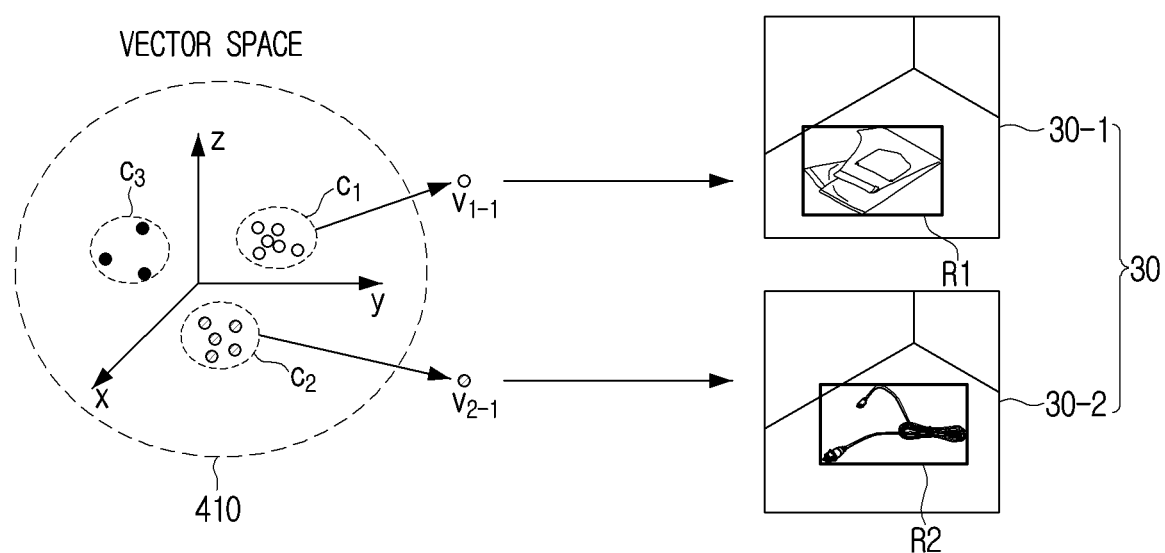
FIG. 4C is a diagram for illustrating a method of obtaining learning data of an electronic device according to an embodiment of the disclosure.

FIG. 4B and FIG. 4C are diagrams for illustrating a method of obtaining learning data of an electronic device according to an embodiment of the disclosure.

Referring to FIG. 4B, the electronic device 100 may cluster the feature values by mapping the feature values of the plurality of respective learning images 15 (namely, learning images 15-1, 15-2 and 15-3) to a vector space 410. Specifically, the electronic device 100 may cluster the feature values by mapping the first to third feature values $V_1$, $V_2$, and $V_3$, respectively corresponding to objects ob1, ob2, and ob3, to a vector space 410. Accordingly, in the vector space 410, a plurality of clusters $C_1$, $C_2$, and $C_3$ including at least one feature value may be formed. Here, the first to third feature values $V_1$, $V_2$, and $V_3$ may be obtained by using the first neural network model 41, as described above. Note that while in FIG. 4B the vector space 410 is illustrated as a three-dimensional space, this is merely an example, and the vector space 410 may be a space in a dimension greater than or equal to three dimensions. Also, each axis x, y, z of the vector space 410 may represent various factors, for example, factors such as colors, sizes, texture, shapes, etc.

Referring to FIG. 4C, the electronic device 100 may identify clusters having greater cohesion than a predetermined value among the plurality of clusters $C_1$, $C_2$, and $C_3$ existing in the vector space 410. For example, the electronic device 100 may identify the first cluster $C_1$ and the second cluster $C_2$ among the plurality of clusters $C_1$, $C_2$, and $C_3$.

The electronic device 100 may obtain photographed images corresponding to the feature values included in the first cluster $C_1$ and the second cluster $C_2$ as the learning data 30. Here, the electronic device 100 may identify a feature value that is the most approximate to the average value of the feature values included in the first cluster $C_1$. For example, the electronic device 100 may identify the 1-1 feature value $V_{1-1}$ included in the first cluster $C_1$. Then, the electronic device 100 may obtain an learning image 15 including an object corresponding to the 1-1 feature value $V_{1-1}$ as the first learning data 30-1. Here, the first learning data 30-1 may include location information regarding the area R1 of the object in the 1-1 feature value $V_{1-1}$. Likewise, the electronic device 100 may identify the 2-1 feature value $V_{2-1}$ that is the most approximate to the average value of the feature values included in the second cluster $C_2$, and obtain an learning image 15 including an object corresponding to the 2-1 feature value $V_{2-1}$ as the second learning data 30-2.

Meanwhile, the electronic device 100 may identify a plurality of feature values $V_n$ for each cluster, and obtain a plurality of learning images 15 corresponding to the plurality of respective identified feature values $V_n$ as the learning data 30. Here, the electronic device 100 may identify feature values $V_n$ that exist within a predetermined distance from the center of each cluster $C_n$, and obtain a plurality of learning images 15 including objects corresponding to the identified feature values $V_n$ as the learning data 30.

Figure 5A:
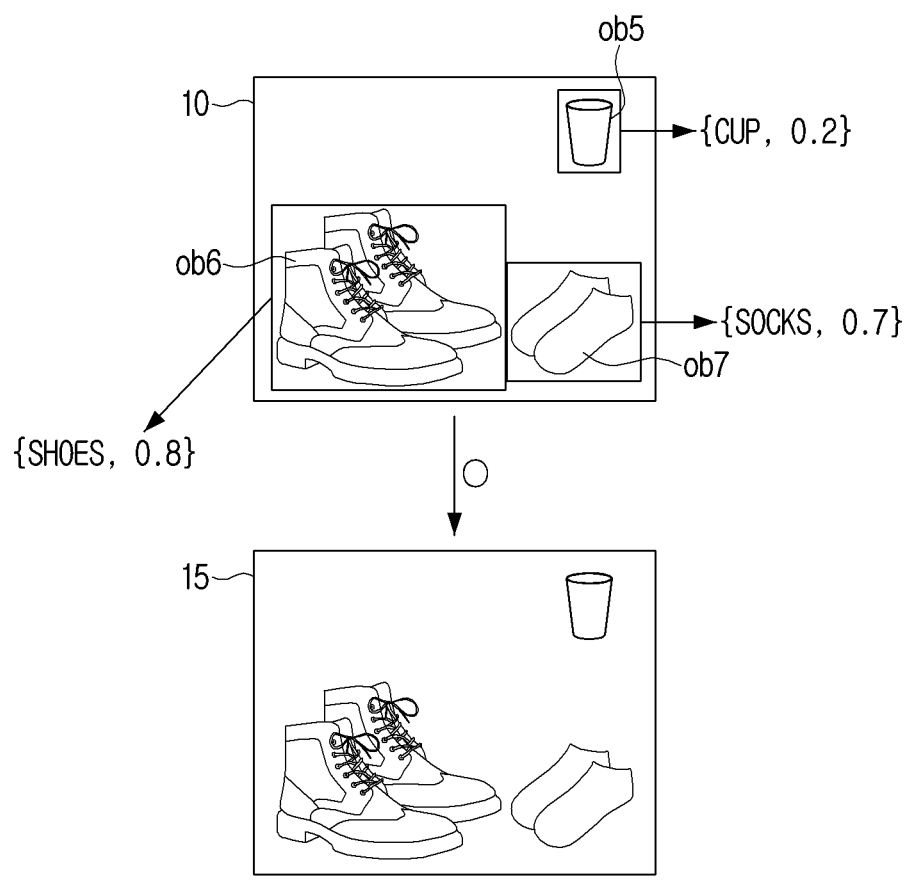
FIG. 5A is a diagram for illustrating a method of identifying learning images according to another embodiment of the disclosure.

FIG. 5A is a diagram for illustrating a method of identifying learning images according to another embodiment of the disclosure. Specifically, FIG. 5A is a diagram for illustrating a method of identifying learning images in case a plurality of objects are included in the photographed images 10.

In case a plurality of objects are included in the photographed images 10, if even one object having a smaller probability value than the predetermined value exists among the plurality of objects, the electronic device 100 may identify the photographed images 10 as the learning images 15. Referring to FIG. 5A, the photographed images 10 may include a fifth object ob5, a sixth object ob6, and a seventh object ob7. Also, the probability value of the fifth object ob5 may be 0.2, the probability value of the sixth object Ob6 may be 0.7, and the probability value of the seventh object ob7 may be 0.8. In an example where the predetermined probability value is 0.7, the electronic device 100 may identify the photographed images 10 as the learning images 15 because the probability value of the fifth object ob5 is smaller than the predetermined value.

Figure 5B:
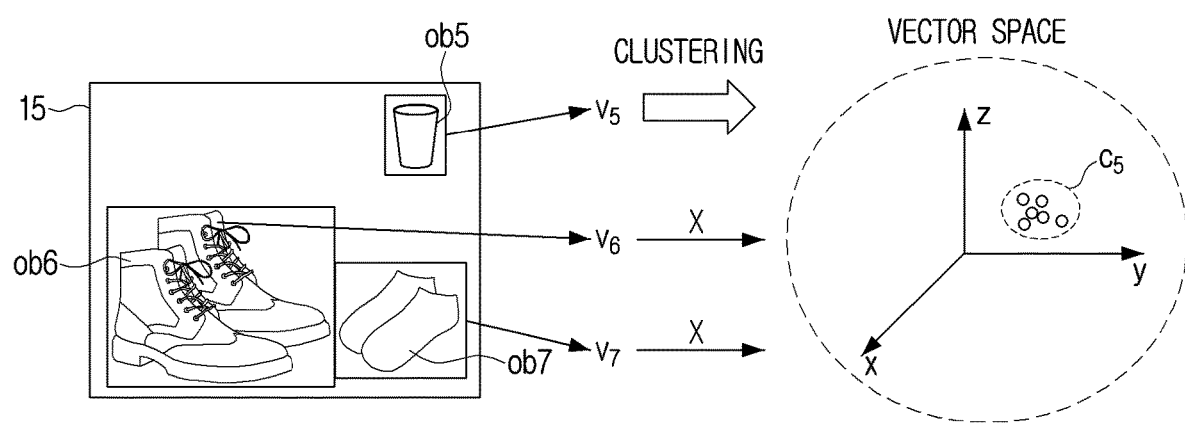
FIG. 5B is a diagram for illustrating a method of clustering according to another embodiment of the disclosure.

FIG. 5B is a diagram for illustrating a method of clustering according to another embodiment of the disclosure. The electronic device 100 may cluster the feature values by mapping feature values for objects included in the learning images to a vector space. Here, the electronic device 100 may identify feature values $V_n$ for objects having smaller probability values than the predetermined value, and map the identified feature values to a vector space 510. Referring to FIG. 5B, the electronic device 100 may identify the fifth feature value $V_5$ for the fifth object ob5 having a smaller probability value than the predetermined value, and cluster the feature value by mapping the fifth feature value $V_5$ to the vector space 510. In contrast, the electronic device 100 may not map the sixth feature value $V_6$ and the seventh feature value $V_7$ for the sixth object ob6 and the seventh object ob7 to vector space 510, as those feature values have greater probability values than the predetermined value.

As described above, the electronic device 100 may obtain the learning data 30 and transmit it to the external device 200. Then, the external device 200 may obtain the second neural network model 42 based on the learning data 30. Hereinafter, the method for the external device 200 to obtain the second neural network model 42 will be described.

Figure 6A:
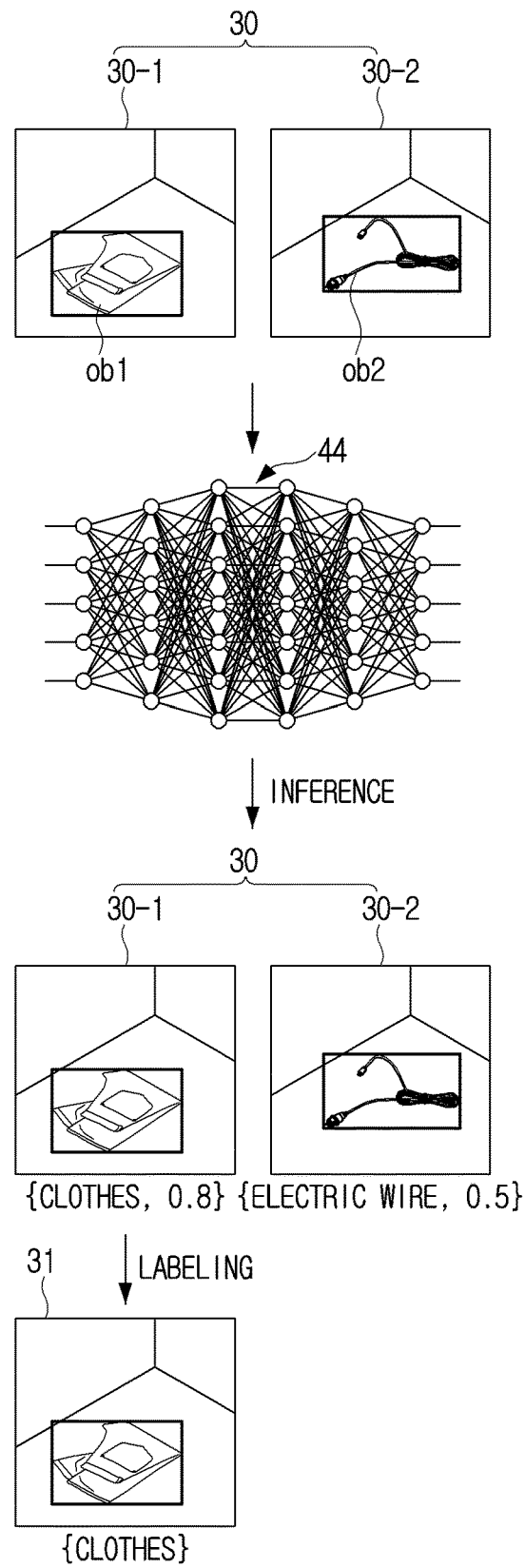
FIG. 6A is a diagram for illustrating a method of obtaining labelled data according to an embodiment of the disclosure.

FIG. 6A is a diagram for illustrating a method of obtaining labelled data according to an embodiment of the disclosure.

The external device 200 may obtain the learning data 30 including the first learning data 30-1 and the second learning data 30-2 from the electronic device 100. The external device 200 may obtain classification values and probability values for objects included in the learning data 30 by inputting the learning data 30 into the fourth neural network model 44. For example, the external device 200 may obtain a classification value ('clothes') and a probability value ('0.8') for the first object ob1 by inputting the first learning data 30-1 into the fourth neural network model 44, and the external device 200 may obtain a classification value ('an electric wire') and a probability value ('0.5') for the second object ob2 by inputting the second learning data 30-2 into the fourth neural network model 44. As described above, the fourth neural network model 44 is a model having a higher performance compared to the first neural network model 41, and it may include a larger number of layers than the first neural network model 41.

The external device 200 may identify an object having a greater probability value than the predetermined value. For example, in case the predetermined value is 0.7, the external device 200 may identify the first object ob1 for which the probability value is greater than 0.7. Then, the external device 200 may perform a labeling operation for the identified object. Here, the external device 200 may match the first learning data 30-1 including the first object ob1 and the classification value ('clothes') for the first object ob1, and store them. Accordingly, the external device 200 may obtain the labelled data 31.

Figure 6B:
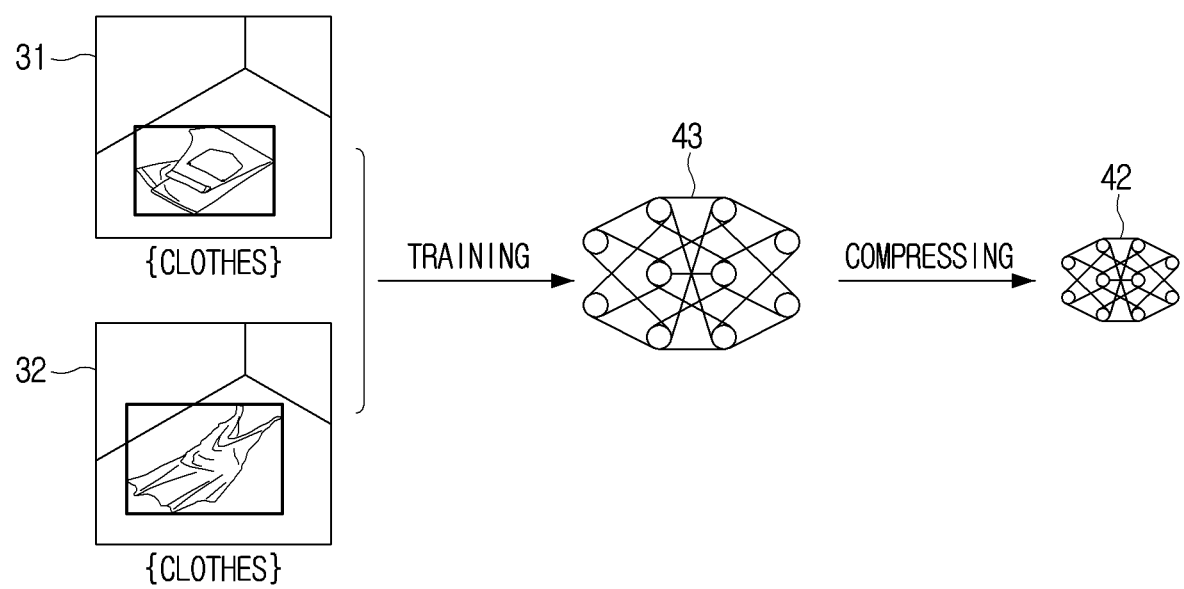
FIG. 6B is a diagram for illustrating a method of obtaining a second neural network model according to an embodiment of the disclosure.

Referring to FIG. 6B, the external device 200 may train the third neural network model 43 based on the labelled data 31. The third neural network model 43 may be trained to be able to identify objects included in the labelled data 31.

Here, the external device 200 may train the third neural network model 43 based on supervised learning.

Meanwhile, the external device 200 may train the third neural network model 43 based on the labelled data 31 and the learning data 32. Here, the learning data 32 is data used for training of the first neural network model 41, and it may be stored in advance in the external device 200. Accordingly, a situation where the third neural network model 43 is biased or overfitted with respect to the labelled data 31 can be prevented.

Figure 6C:
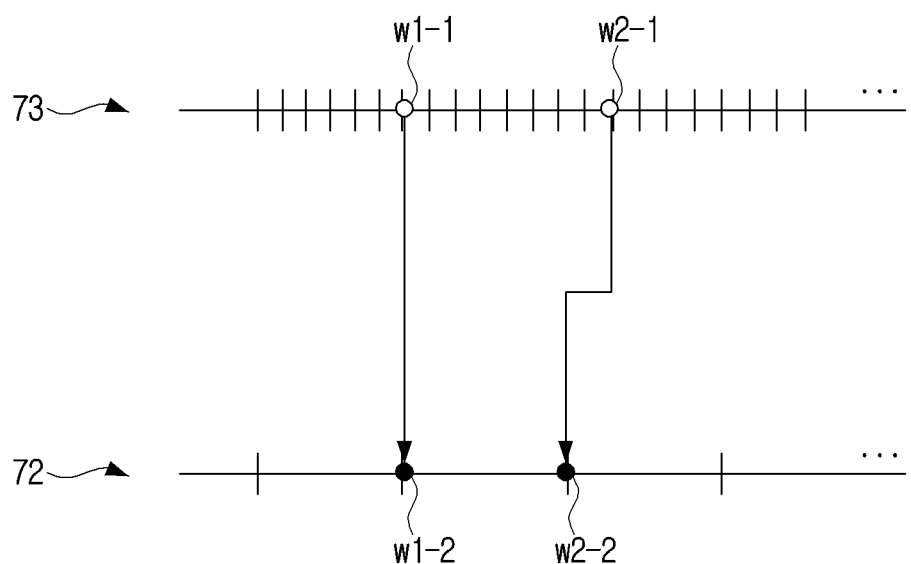
FIG. 6C is a diagram for illustrating a method of compressing a neural network model according to an embodiment of the disclosure.

The external device 200 may obtain the second neural network model 42 by compressing the weight of the third neural network model 43. Specifically, the external device 200 may obtain the weighted value of the second neural network model 42 by reducing the size of the data type of the weighted value (or the parameter) of the third neural network model 43. Referring to FIG. 6C, the third neural network model 43 may have the 1-1 weighted value w1-1 and the 2-1 weighted value w2-1 of the third data type 73. For example, the third data type 73 may be a 32-bit float type. Also, the second neural network model 42 may have the 1-2 weighted value w1-2 and the 2-2 weighted value w2-2 of the second data type 72. For example, the second data type 72 may be an 8-bit integer type.

As illustrated in FIG. 6C, as the external device 200 converts the third data type 73 to the second data type 72, the 1-2 weighted value w1-2 and the 2-2 weighted value w2-2 may be obtained from the 1-1 weighted value w1-1 and the 2-1 weighted value w2-1. Here, the external device 200 may obtain values that are respectively the most approximate to the 1-1 weighted value w1-1 and the 2-1 weighted value w2-1 as the 1-2 weighted value w1-2 and the 2-2 weighted value w2-2. For example, the external device 200 may obtain the value which is the most approximate to the 1-1 weighted value w1-1 among the values of the second data type 72 as the 1-2 weighted value w1-2. Here, the 1-1 weighted value w1-1 and the 1-2 weighted value w1-2 may have the same value. Also, the external device 200 may obtain the 2-2 weighted value w2-2 which is the most approximate value to the 2-1 weighted value w2-1 among the values of the second data type 72.

The external device 200 may transmit information on the obtained second neural network model 42 to the electronic device 100. Specifically, the external device 200 may transmit the second neural network model 42 to the electronic device 100. Alternatively, the external device 200 may transmit the parameter (or the weighted value) of the second neural network model 42 to the electronic device 100. Meanwhile, the external device 200 may transmit the second neural network model 42 or the parameter (or the weighted value) of the second neural network model 42 to the electronic device 100 based on the available capacity of the memory 140. For example, if the available capacity of the memory 140 is smaller than a predetermined value, the external device 200 may transmit only parameter information excluding the configuration information for the second neural network model 42 to the electronic device 100. Alternatively, if the available capacity of the memory 140 is greater than the predetermined value, the external device 200 may transmit the second neural network model 42 itself including the configuration information and the parameter information for the second neural network model 42.

The electronic device 100 may update the first neural network model 41 based on the received information on the second neural network model 42. For example, if the second neural network model 42 was received, the electronic device 100 may store the second neural network model 42 in the memory 140, and delete the pre-stored first neural network model 41. Alternatively, in case the parameter of the second neural network model 42 was received, the electronic device 100 may update the first neural network model 41 by changing the parameter of the first neural network model 41 to the parameter of the second neural network model 42.

In the above, the operations of the electronic device and the external device were described.

Hereinafter, a controlling method of the electronic device and the external device will be described.

Figure 7A:
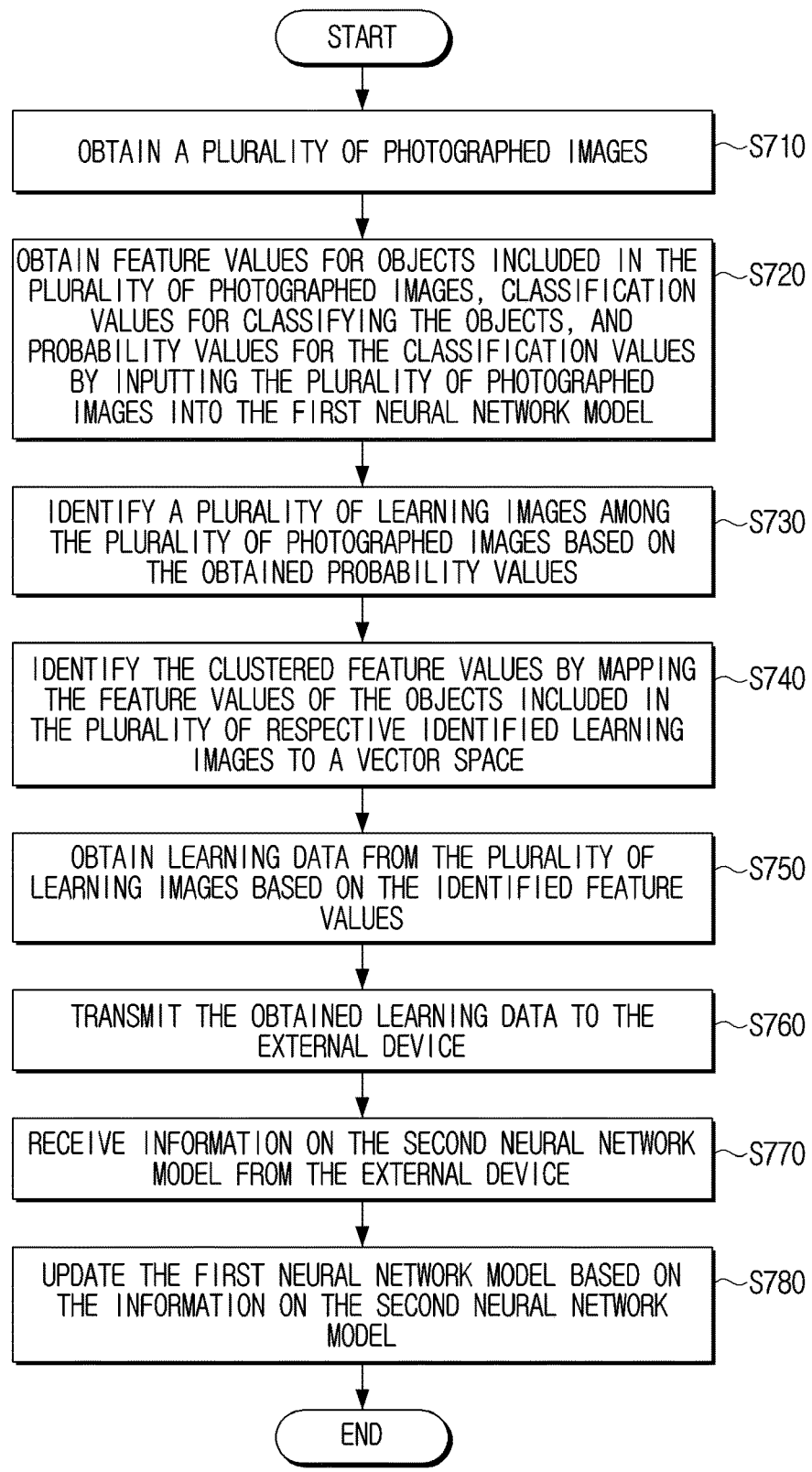
FIG. 7A is a flow chart illustrating a control method of an electronic device according to an embodiment of the disclosure.

FIG. 7A is a flow chart illustrating a controlling method of an electronic device according to an embodiment of the disclosure. Referring to FIG. 7A, the electronic device 100 may obtain a plurality of photographed images in operation S710. Here, the electronic device 100 may obtain photographed images 10 showing the surroundings of the electronic device 100 through the camera 110. Alternatively, the electronic device 100 may obtain a plurality of photographed images 10 from the external device 200 through the communication interface 120.

The electronic device 100 may obtain feature values $V_n$ for objects ob included in the plurality of photographed images 10 by inputting the plurality of photographed images 10 into the first neural network model 41, classification values for classifying the objects ob, and probability values for the classification values in operation S720. Here, the classification values (or the predicted classes) and the probability values may be obtained as the feature values $V_n$ for the objects ob are input into an output layer included in the first neural network model 41. Accordingly, the classification values and the probability values may respectively correspond to the feature values $V_n$.

The electronic device 100 may identify a plurality of learning images 15 among the plurality of photographed images 10 based on the obtained probability values in operation S730. Here, the electronic device 100 may identify the learning images 15 as the photographed images 10 including objects ob having smaller probability values than a predetermined value.

The electronic device 100 may identify the clustered feature values in operation S740 by mapping the feature values of the objects included in the plurality of respective identified learning images 15 to a vector space (e.g., vector space 410). Here, the electronic device 100 may identify clusters $C_n$ having greater cohesion than a predetermined value among the plurality of clusters existing in the vector space, and identify feature values included in the identified clusters $C_n$.

The electronic device 100 may obtain learning data 30 from the plurality of learning images 15 based on the identified feature values in operation S750. Here, the electronic device 100 may identify a feature value that is the most approximate to the average value of the plurality of feature values included in the identified clusters $C_n$. Then, the electronic device 100 may obtain an image to be learned including an object corresponding to the identified feature value as the learning data 30.

The electronic device 100 may transmit the obtained learning data 30 to the external device in operation S760. Here, the learning data 30 may include raw data of the image to be learned (or the photographed image) and location information of the object within the image to be learned.

The electronic device 100 may receive information on the second neural network model 42 from the external device 200 in operation S770. Then, the electronic device 100 may update the first neural network model 41 based on the information on the second neural network model 42 in operation S780. Here, where the second neural network model 42 is received, the electronic device 100 may store the second neural network model 42 in the memory 140, and delete the pre-stored first neural network model 41. Alternatively, where the parameter of the second neural network model 42 is received, the electronic device 100 may update the first neural network model 41 by changing the parameter of the first neural network model 41 to the parameter of the second neural network model 42.

Figure 7B:
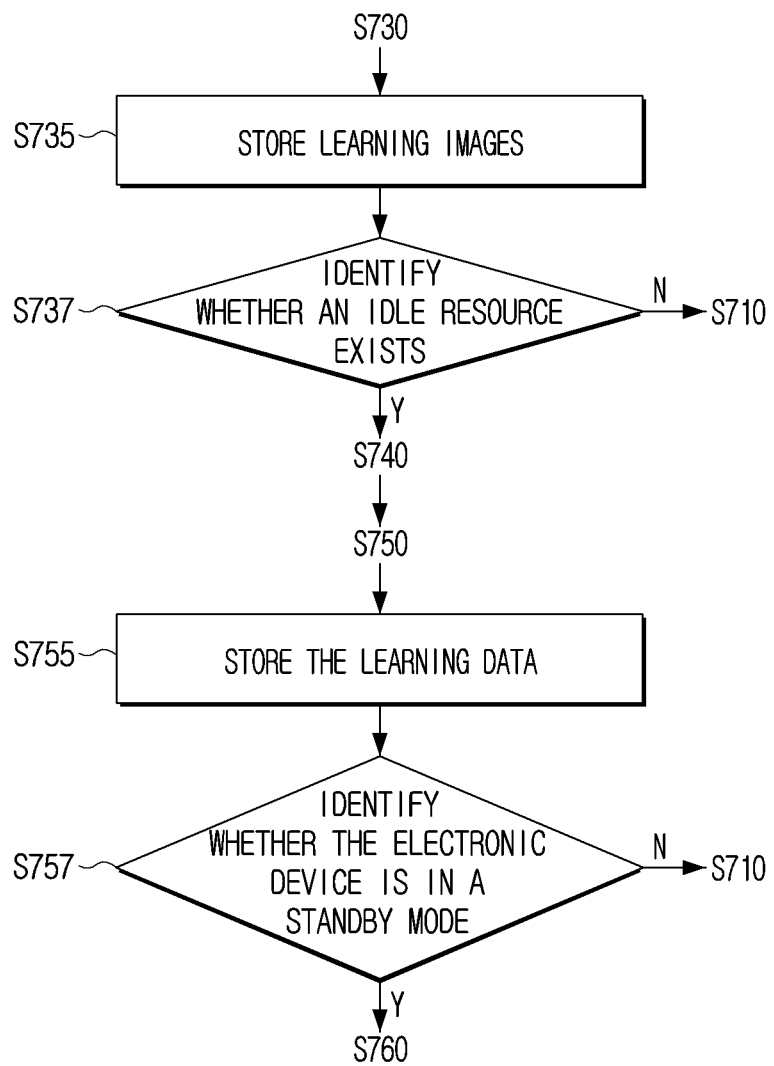
FIG. 7B is a flow chart illustrating a controlling method of an electronic device according to another embodiment of the disclosure.

FIG. 7B is a flow chart illustrating a controlling method of an electronic device according to an embodiment of the disclosure. Referring to FIG. 7B, the electronic device 100 may identify a plurality of learning images 15 in operation S730, and store the identified learning images 15 in operation S735. Here, the electronic device 100 may store the plurality of identified learning images 15 in the memory 140.

Then, the electronic device 100 may identify whether an idle resource exists in operation S737. Specifically, the electronic device 100 may identify whether the idle value of the processor 150 is greater than or equal to a predetermined value (e.g., 90%). Alternatively, the electronic device 100 may identify whether the use amount of the memory 140 is smaller than or equal to a predetermined value (e.g., 10%).

If it is identified that an idle resource does not exist, the electronic device 100 may return to the operation S710 in FIG. 7A, and obtain a plurality of photographed images 10. Then, the electronic device 100 may identify a plurality of learning images 15 among the plurality of obtained photographed images 10 in operation S730, and store the images 10 in operation S735.

If it is identified that an idle resource exists, the electronic device 100 may identify clustered feature values $V_n$ by mapping feature values of objects included in the plurality of respective learning images 15 to a vector space (e.g., vector space 410) as in the operation S740 in FIG. 7A. The electronic device 100 may then obtain learning data 30 from the plurality of learning images 15 based on the identified feature values in operation S750. Then, the electronic device 100 may store the obtained learning data 30 in operation S755.

The electronic device 100 may identify whether the electronic device 100 is in a standby mode in operation S757. Here, the standby mode may be a mode wherein the electronic device 100 is charged by an external power device. If the electronic device 100 is not identified to be in the standby mode, the electronic device 100 may return to the operation S710 in FIG. 7A, and obtain a plurality of photographed images 10. Then, the electronic device 100 may identify a plurality of learning images 15 among the plurality of obtained photographed images 10 in operation S730, and store the images in operation S735.

If the electronic device 100 is identified to be in the standby mode, the electronic device 100 may transmit the obtained learning data 30 to the external device 200 as in the operation S760 in FIG. 7A. Here, the obtained learning data 30 is the learning data 30 stored in the operation S755. Then, the electronic device 100 may receive information on the second neural network model 42 from the external device 200 in operation S770, and update the first neural network model 41 based on the information on the second neural network model 42 in operation S780. Meanwhile, in the above, it was described that, when the electronic device 100 enters the standby mode, the electronic device 100 transmits the learning data 30 to the external device 200. However, this is merely an example, and the electronic device 100 may transmit the stored learning data 30 to the external device 200 when a user instruction for updating the first neural network model 41 is input.

Figure 8:
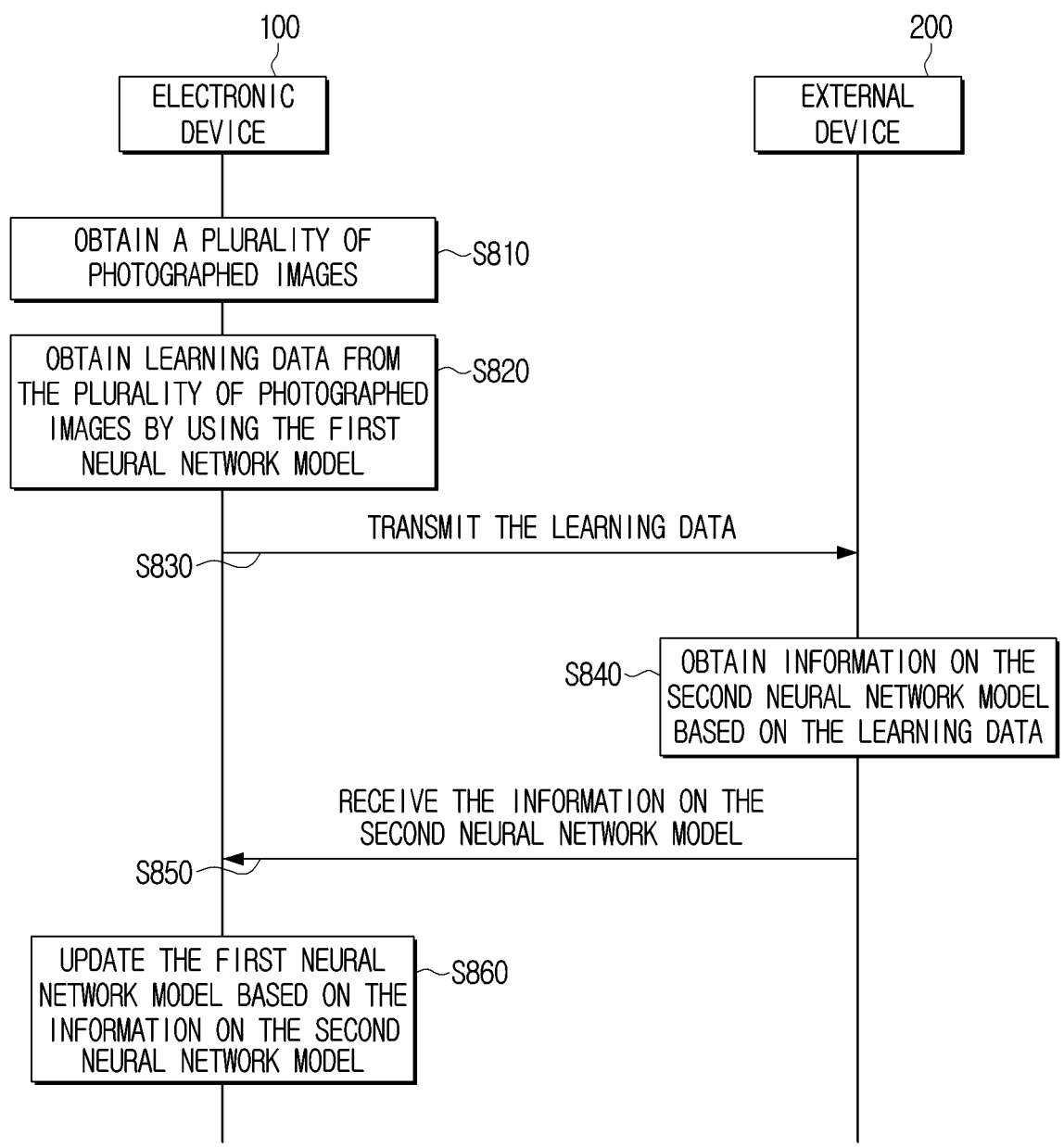
FIG. 8 is a sequence diagram for illustrating a neural network model update system according to an embodiment of the disclosure.

FIG. 8 is a sequence diagram for illustrating a neural network model update system according to an embodiment of the disclosure. The electronic device 100 may obtain a plurality of photographed images 10 in operation S810. As the operation corresponds to the operation S710, detailed explanation in this regard will be omitted.

The electronic device 100 may obtain learning data 30 from the plurality of photographed images 10 by using the first neural network model 41 in operation S820. Specifically, the electronic device 100 may obtain learning data 30 through the operations S720, S730, S740, and S750 in FIG. 8A. Then, the electronic device 100 may transmit the learning data 30 to the external device 200 in operation S830. The external device 200 may obtain information on the second neural network model 42 based on the learning data 30 in operation S840. Here, the external device 200 may obtain labelled data 31 from the learning data 30 by using the fourth neural network model 44. Then, the external device 200 may train the third neural network model 43 based on the labelled data 31, and compress the weight of the third neural network model 43, and obtain information on the second neural network model 42.

Then, the electronic device 100 may receive the information on the second neural network model 42 from the external device 200 in operation S850, and update the first neural network model 41 based on the information on the second neural network model 42 in operation S860.

Meanwhile, the various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Meanwhile, computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Meanwhile, a storage medium that is readable by machines may be provided in the form of a non-transitory storage medium. Here, the term "a non-transitory storage medium" only means that the device is a tangible device, and does not include a signal (e.g.: an electronic wave), and the term does not distinguish a case wherein data is stored semi-permanently in a storage medium and a case wherein data is stored temporarily. For example, "a non-transitory storage medium" may include a buffer wherein data is temporarily stored.

Also, according to an embodiment, methods according to the various embodiments disclosed herein may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed directly on-line (e.g., download or upload) through an application store (e.g., Play Store™), or between two user devices (e.g., smartphones). In the case of on-line distribution, at least a portion of a computer program product (e.g., a downloadable app) may be stored in a storage medium readable by machines such as the server of the manufacturer, the server of the application store, and the memory of the relay server at least temporarily, or may be generated temporarily.

Further, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method of controlling an electronic device, the method comprising:
    obtaining a plurality of images, wherein the plurality of images include an one or more objects;
    inputting the plurality of images into a first neural network model for identifying objects, and based on the inputting of the plurality of images into the first neural network model for identifying objects, obtaining a feature value for each object of the one or more objects, a predicted class for each object of the one or more objects based on the respective obtained feature value, and a probability value for the predicted class for each of the one or more objects;
    identifying one or more learning images among the plurality of images based on the obtained probability values;
    identifying one or more clusters of feature values by mapping the feature values of the one or more objects included in the one or more identified learning images to a vector space;
    obtaining learning data from the one or more identified learning images based on the feature values of the one or more clusters;
    transmitting the obtained learning data to an external device;
    receiving information on a second neural network model from the external device; and
    updating the first neural network model based on the received information on the second neural network model.

2. The controlling method of claim 1,
wherein the identifying the one or more learning images further comprises:
    identifying the one or more learning images based on the inclusion of objects from among the one or more objects for which the probability value is less than a predetermined value.

3. The controlling method of claim 1,
wherein the obtaining the learning data further comprises:
    identifying at least one cluster having greater cohesion than a predetermined value among the one or more clusters of feature values including the feature values of the one or more objects included in the one or more identified learning images; and
    obtaining one or more images corresponding to the feature values included in the identified at least one cluster of feature values as the learning data.

4. The controlling method of claim 3,
wherein the obtaining the one or more images corresponding to the feature values included in the identified at least one cluster of feature values as the learning data comprises:
    identifying and obtaining as the learning data an image corresponding to a feature value that is the most approximate to the average of the feature values included in the identified at least one cluster of feature values.

5. The controlling method of claim 3, further comprising:
storing the obtained learning data,
wherein the storing comprises:
    identifying a cluster of feature values including feature values greater than or equal to a predetermined number among the identified at least one cluster of feature values, and storing images corresponding to the feature values included in the identified cluster.

6. The controlling method of claim 1,
wherein the learning data is at least one image among the one or more learning images, and wherein the learning data comprises location information of pixels corresponding to the objects included in the at least one image.

7. The controlling method of claim 1,
wherein the second neural network model is a model obtained from a third neural network model having a greater accuracy than the first neural network model, and wherein the third neural network was trained based on the obtained learning data.

8. An electronic device comprising:
a communication interface including at least one circuit;
a memory including at least one instruction; and
a processor,
wherein the processor is configured to:
    obtain a plurality of images, wherein the plurality of images include an one or more objects,
    obtain, by inputting the plurality of photographed images into a first neural network model for identifying objects: a feature value for each object of the one or more objects, a predicted class for each object of the one or more objects based on the respective obtained feature values, and a probability value for the predicted class for each of the one or more objects,
    identify one or more learning images among the plurality of images based on the obtained probability values,
    identify one or more clusters of feature values by mapping the feature values of the one or more objects included in the one or more identified learning images to a vector space,
    obtain learning data from the one or more identified learning images based on the feature values of the one or more clusters,
    transmit the obtained learning data to an external device through the communication interface,
    receive information on a second neural network model from the external device, and update the first neural network model based on the received information on the second neural network model.

9. The electronic device of claim 8,
wherein the processor is further configured to:
identify the one or more leaning images based on the inclusion of objects from among the one or more objects for which the probability values are less than a predetermined value.

10. The electronic device of claim 8,
wherein the processor is further configured to:
identify at least one cluster having greater cohesion than a predetermined value among the one or more clusters of feature values including the feature values of the one or more objects included in the identified learning images, and
obtain one or more images corresponding to the feature values included in the identified at least one cluster of feature values as the learning data.

11. The electronic device of claim 10,
wherein the processor is further configured to:
identify and obtain as the learning data an image corresponding to a feature value that is the most approximate to the average of the feature values included in the identified at least one cluster of feature values.

12. The electronic device of claim 10,
wherein the processor is further configured to:
identify a cluster of feature values including feature values greater than or equal to a predetermined number among the identified at least one cluster, and store images corresponding to the feature values included in the identified cluster of feature values.

13. The electronic device of claim 9,
wherein the learning data is at least one image among the one or more learning images, and wherein the learning data comprises location information of pixels corresponding to the objects included in the at least one image.

14. The electronic device of claim 9,
wherein the second neural network model is a model obtained from a third neural network model having a greater accuracy than the first neural network model, and wherein the third neural network was trained based on the obtained learning data.

15. A neural network model update system including an electronic device and an external device, wherein the electronic device is configured to:
obtain a plurality of images, obtain learning data from the plurality of photographed images by using a first neural network model, transmit the obtained learning data to the external device, receive from the external device information on a second neural network model, and update the first neural network model based on the information on the second neural network model obtained from the external device, and
the external device is configured to:
input the learning data into a fourth neural network model and obtain a labelled data, train a third neural network model based on the labelled data, obtain the information on the second neural network model by compressing the third neural network model, and transmit the information on the second neural network model to the electronic device.

\* \* \* \* \*